US006805334B2

(12) United States Patent
Forsberg et al.

(10) Patent No.: US 6,805,334 B2
(45) Date of Patent: Oct. 19, 2004

(54) APPARATUS FOR PULLING COMMUNICATION CABLE

(75) Inventors: Kevin Forsberg, Orlando, FL (US); Tracy L. Selig, Oriedo, FL (US); Isaac D. M. White, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 72 days.

(21) Appl. No.: 10/229,323

(22) Filed: Aug. 27, 2002

(65) Prior Publication Data

US 2004/0108496 A1 Jun. 10, 2004

(51) Int. Cl.[7] .............................................. E21C 29/16
(52) U.S. Cl. ............................................. 254/134.3 FT
(58) Field of Search ............................. 254/134.3 FT, 254/134.3 R, 7 C, 7 R, 9 C, 9 R, 8 C, 8 R, 122, 129; 108/169, 170, 173, 162, 130, 125, 115, 127, 128, 129

(56) References Cited

U.S. PATENT DOCUMENTS

| | | |
|---|---|---|
| 401,225 A | 4/1889 | Smith |
| 2,284,532 A | 5/1942 | Napier |
| 2,621,021 A * | 12/1952 | Dahl et al. ................... 254/122 |
| 2,990,160 A | 6/1961 | Foley |
| 3,072,382 A | 1/1963 | Jones |
| 3,072,383 A | 1/1963 | Vanderhagen |
| 3,113,759 A | 12/1963 | Lindmark |
| 3,968,952 A | 7/1976 | Newell |
| 4,033,551 A | 7/1977 | Lindstrom |
| 4,270,734 A | 6/1981 | Straight |
| 4,442,903 A * | 4/1984 | Schutt et al. ....... 254/134.3 FT |
| 4,456,225 A | 6/1984 | Lucas |
| 4,801,127 A | 1/1989 | Patterson |
| 5,464,193 A | 11/1995 | Wrate |
| 6,003,842 A | 12/1999 | Hug |
| 6,286,815 B1 | 9/2001 | Ray |
| 6,533,248 B1 * | 3/2003 | Schafer .............. 254/134.3 FT |

* cited by examiner

Primary Examiner—Robert C. Watson
(74) Attorney, Agent, or Firm—Walters & Zimmerman; Jennifer Medlin; Todd Mitchem

(57) ABSTRACT

An apparatus is disclosed for pulling communication cable through conduit. The apparatus has a winch mounted to a stand. The stand includes a base connected to an upper frame by at least three supports. At least one of the supports is pivotally mounted to at least one of the base and the upper frame such that the upper frame collapses toward the base. The stand is positioned above the conduit, the communication cable is attached to the winch, and the winch is used to pull the communication cable through the conduit.

12 Claims, 11 Drawing Sheets

APPARATUS FOR PULLING COMMUNICATION CABLE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to an apparatuses for applying a pulling force and, more particularly, to an apparatus for the placement of communication cables in a conduit.

2. Description of the Related Art

U.S. Pat. No. 401,225 issued to Smith (Apr. 9, 1889) shows a winch mounted to a winch stand, and the winch stand comprises a supplementary adjustable pulley-frame adapted to be inserted in a manhole. U.S. Pat. No. 2,990,160 issued to Foley (Jun. 27, 1961), and U.S. Pat. No. 3,113,759 issued to Lindmark (Dec. 10, 1963), each shows a winch mounted to a single member elongated frame. U.S. Pat. No. 3,072,382 issued to Jones (Jan. 8, 1963) shows a winch mounted to a support assembly, and the support assembly includes a long rigid brace pivotally attached to one end of the support assembly. U.S. Pat. No. 3,072,383 issued to Vanderhagen (Jan. 8, 1963) describes a cable pulling machine having an upright, elongated frame with a base. U.S. Pat. No. 3,968,952 issued to Newell (Jul. 13, 1976) shows a mechanism for pulling cable, and the mechanism has a two-member support frame, a base frame section, and a boom frame section.

BRIEF SUMMARY OF THE INVENTION

This invention is an apparatus for pulling communication cable through a conduit. The apparatus is a winch mounted to a collapsible stand. An individual places the apparatus above an open end of the conduit and then uses the winch to pull the communication cable through the conduit. When the job is complete, the stand collapses and allows the individual to easily stow the apparatus. The term "communication cable," as used herein, describes conductive cabling, such as copper cables and twisted pairs, for telecommunications uses. The term "conduit," as used herein, describes plastic tubing, polyvinylchloride (PVC) tubing, steel tubing, and other tubing used to protect communication cables.

One embodiment of this invention describes an apparatus for pulling communication cable through conduit. The apparatus has a winch mounted to a stand. The stand includes a base connected to an upper frame by at least three supports. At least one of the supports is pivotally mounted to at least one of the base and the upper frame such that the upper frame collapses toward the base. The stand is positioned above the conduit, and the winch is used to pull the communication cable through the conduit.

Another embodiment also describes an apparatus for pulling communication cable through conduit. A winch mounts to a stand, and the stand comprises a base connected to an upper frame by at least three supports. The base has at least three coplanar base members and the upper frame also has at least three coplanar upper members. Each support comprises an upper portion hinged to a lower portion, and each support pivotally mounts to the base and to the upper frame such that the upper frame collapses toward the base with a scissors motion. The stand is positioned above the conduit, and the winch is used to pull the communication cable through the conduit

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
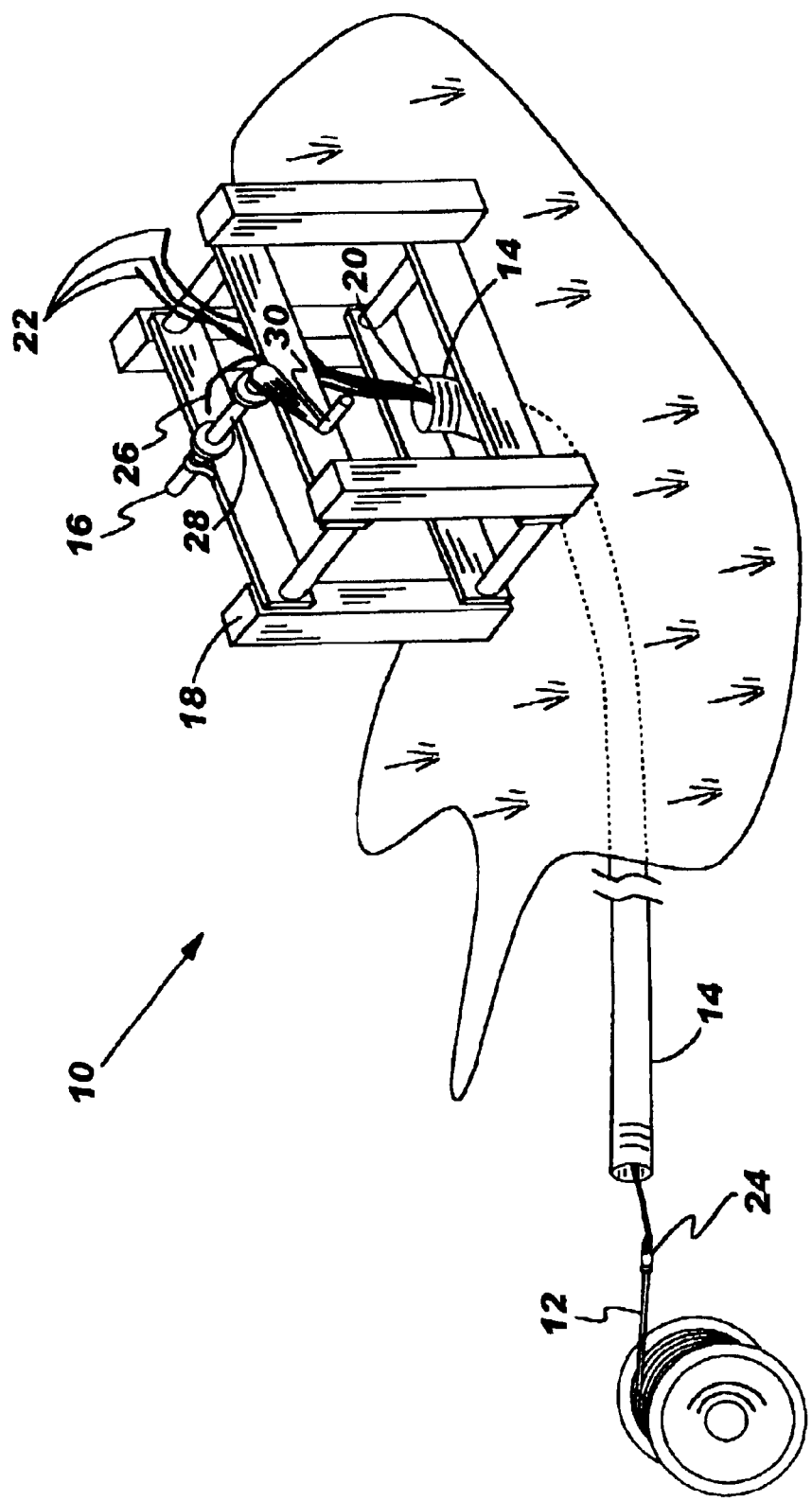
FIG. 1 is an isometric drawing illustrating the use of an apparatus for pulling communication cable through conduit.

FIG. 1 is an isometric drawing illustrating the use of an apparatus 10 for pulling communication cable 12 through conduit 14. The apparatus comprises a winch 16 mounted to a stand 18. An individual positions the apparatus 10 above an open end 20 of the conduit 14. The conduit 14 may have one or more pull strings 22 preinstalled in the conduit 14. The individual attaches a distal end 24 of the pull string 22 to the communication cable 12, and the individual attaches a proximate end 26 to a drum 28 of the winch 16. The individual then turns a handle 30 of the winch 16, and the winch 16 pulls the communication cable 12 through the conduit 14.

Figure 2:
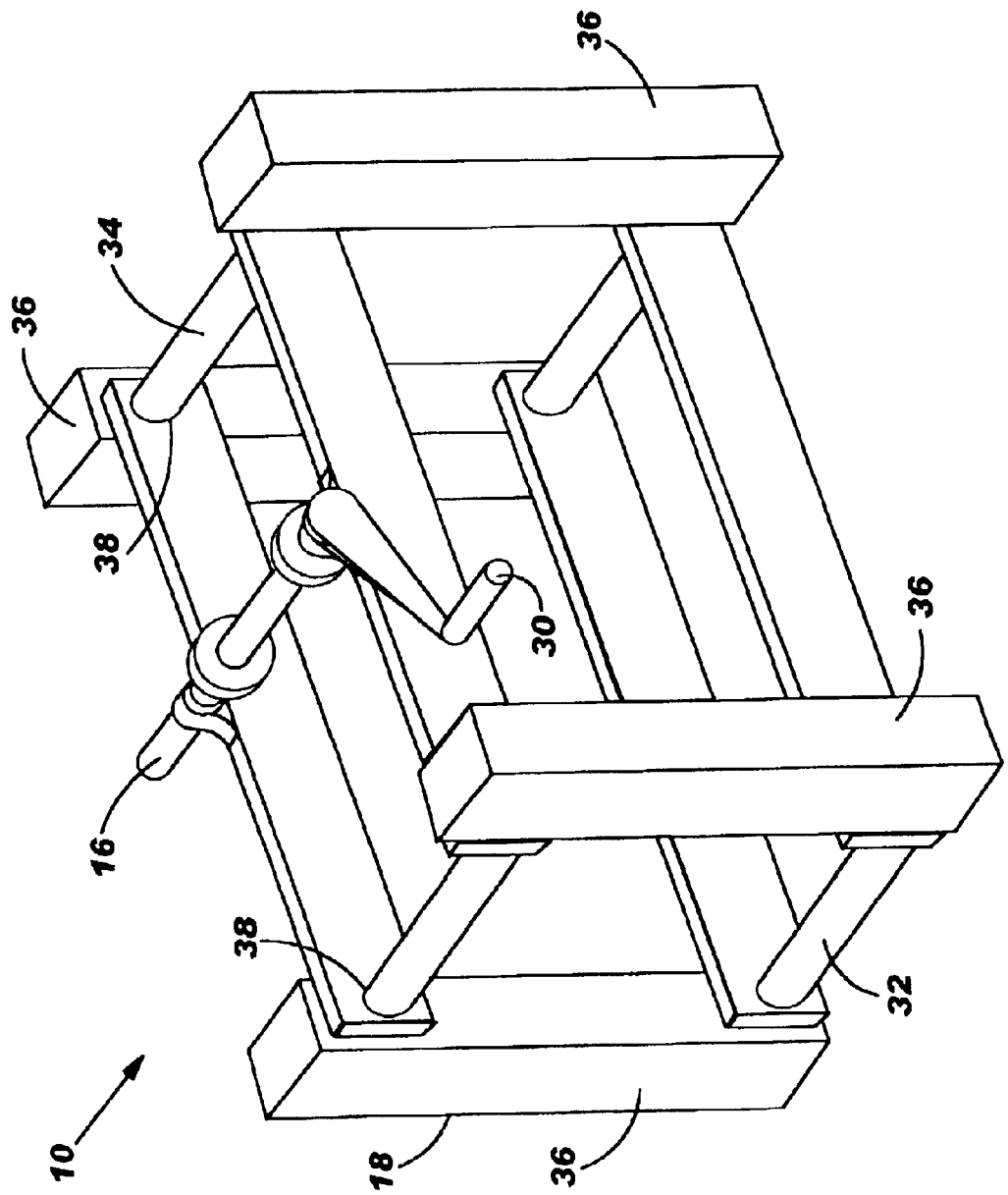
FIGS. 2 and 3 are detailed views of one embodiment of the apparatus.
Figure 3:
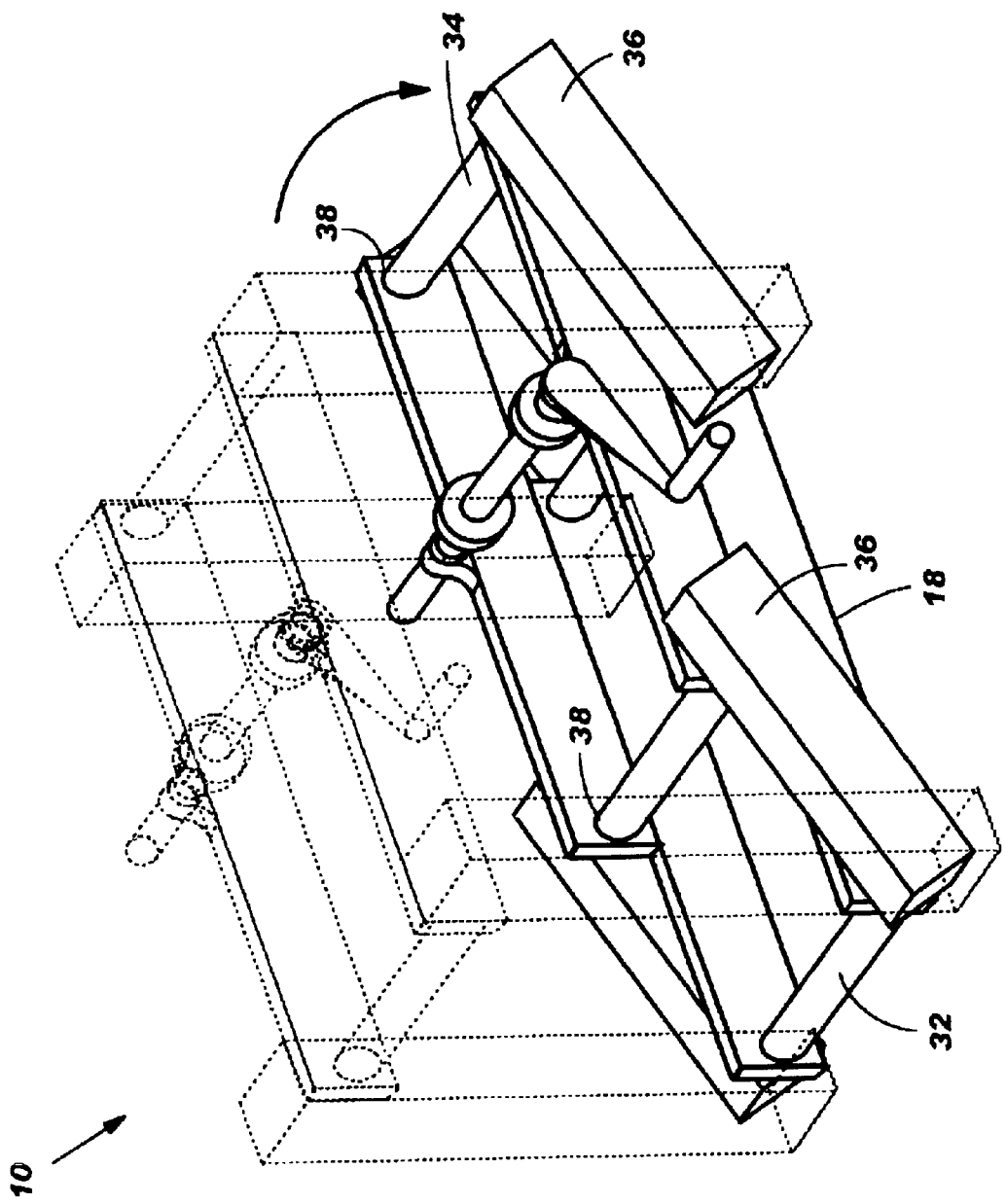

FIGS. 2 and 3 are detailed views of one embodiment of the apparatus 10. FIG. 2 is an isometric view of this embodiment, while FIG. 3 is an orthographic view. The stand 18 has a base 32 connected to an upper frame 34 by a plurality of upwardly extending supports 36. At least one of the supports 36 is pivotally mounted 38 to at least one of the base 32 and the upper frame 34. As FIG. 3 shows, because at least one of the supports 36 is pivotally mounted, an individual may collapse the upper frame 34 toward the base 32. The pivotal mount 38 comprises a bolt or pin (not shown) that allows the stand 18 to collapse for easier stowing and for easier carrying.

Figure 4:
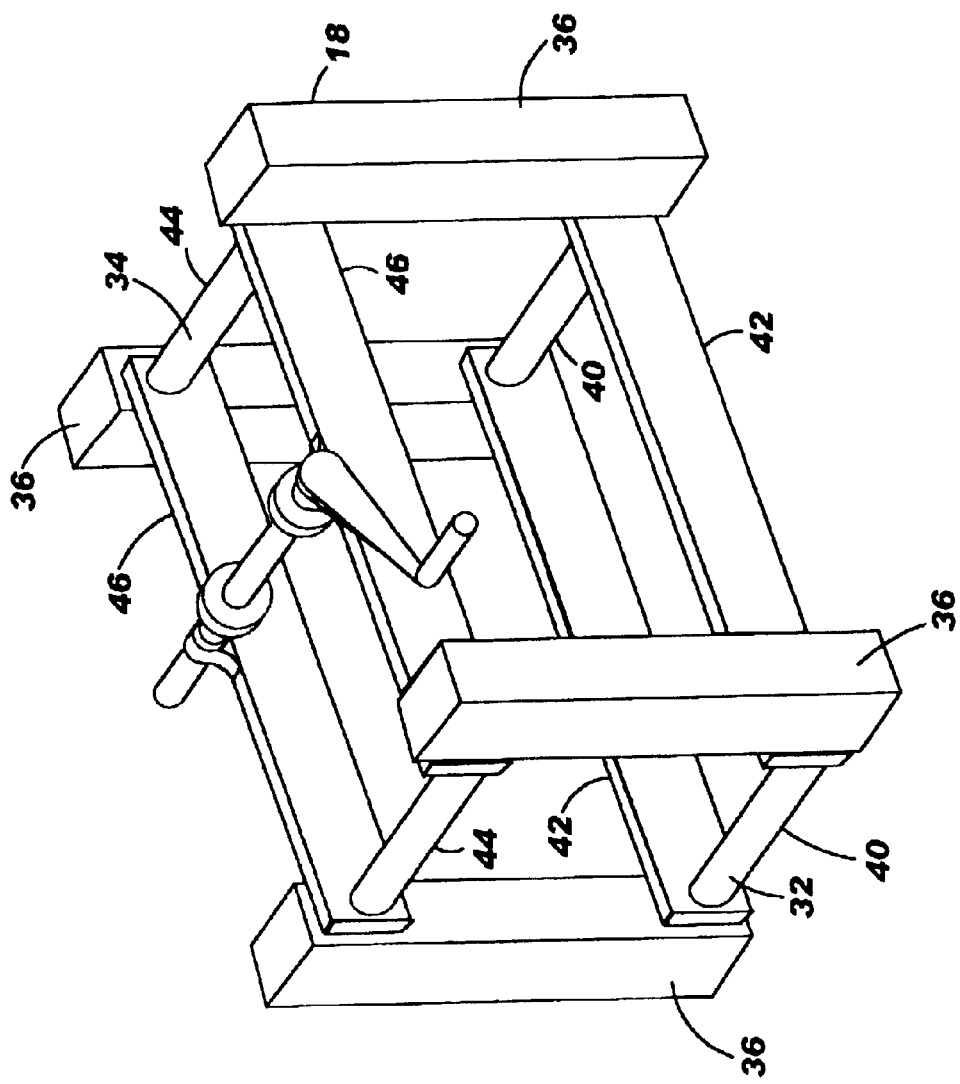
FIG. 4 is an isometric view of another embodiment of the apparatus.

FIG. 4 is an isometric view of an embodiment showing the base 32 and the upper frame 34 having a rectangular shape. The base 32 comprises at least three (3) base members, shown as a pair of parallel lateral members 40 and a pair of longitudinal members 42. The upper frame 34, likewise, comprises at least three (3) upper members, shown as a pair of lateral members 44 and a pair of longitudinal members 46. While the base 32 and the upper frame 34 may have any size, the lateral members 40, 44 and the longitudinal members 42, 46 preferably have a length of about one foot (1 ft.). The supports 36 also preferably have a length of one foot (1 ft.). Because the supports 36, the lateral members 40 and 44, and the longitudinal members 42 and 46 each have a preferable length of about one foot (1 ft.), the stand 18 preferably has a volume not exceeding about one cubic foot (1 ft$^3$). This size allows an individual to easily carry and stow the apparatus 10, and this size is adequate for pulling communication cable in most residential and business installations.

Figure 5:
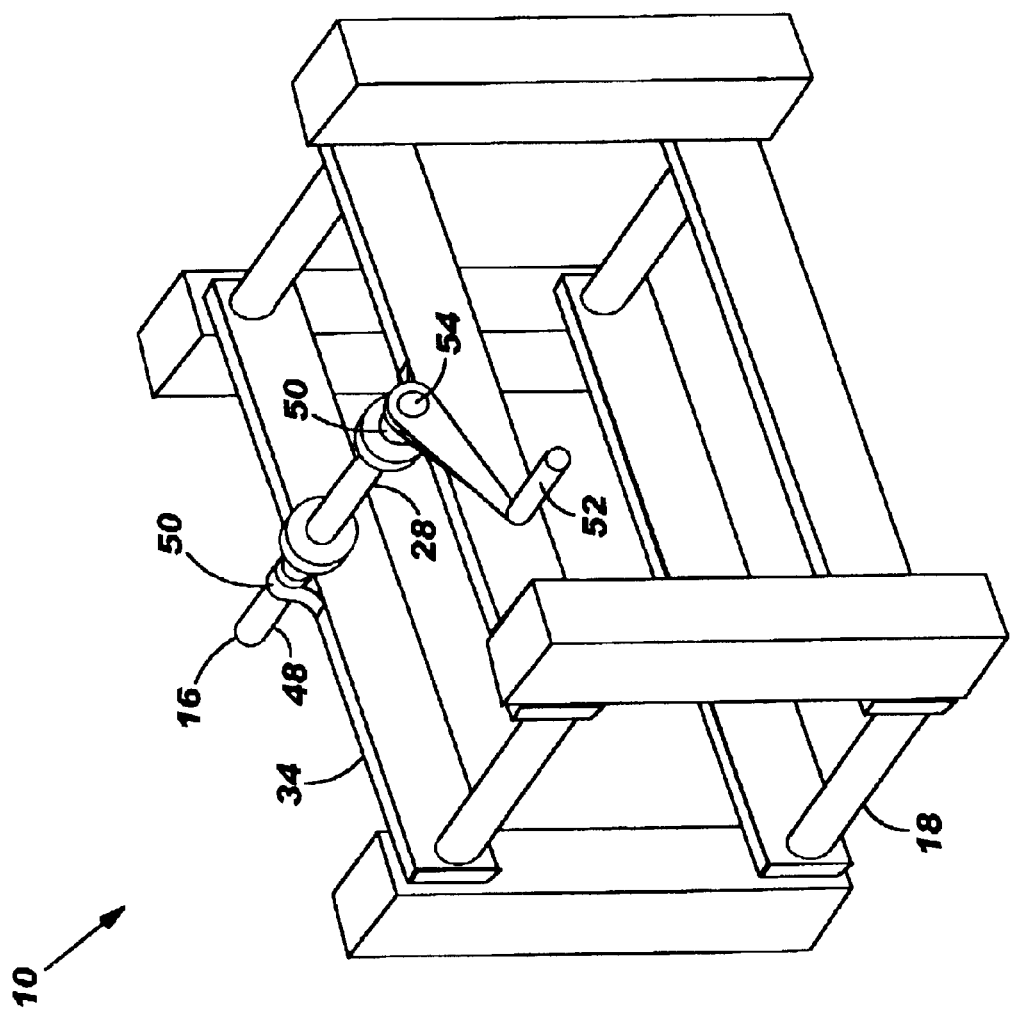
FIG. 5 is a detailed view of the winch shown in FIG. 1.

FIG. 5 is a detailed view of the winch 16 shown in FIGS. 1–4. The winch 16 is a typical winding device, and the winch 16 comprises the drum 28 affixed to a spindle 48. The spindle 48 is journalled by a pair of journal bearings 50. The journal bearings 50 are mounted to the upper frame 34. A handle 52 is detachably mounted to a projecting end 54 of the spindle 48. The winch 16 may also include a releasable ratchet and pawl gear (not shown) that prevents unwinding rotation of the drum 28. The winch 16 could also include a brake and a slipping clutch (each not shown). The brake helps reduce uncontrolled rotation of the drum 28, and the slip clutch prevents an excessive torque while pulling the communication cable.

Figure 6:
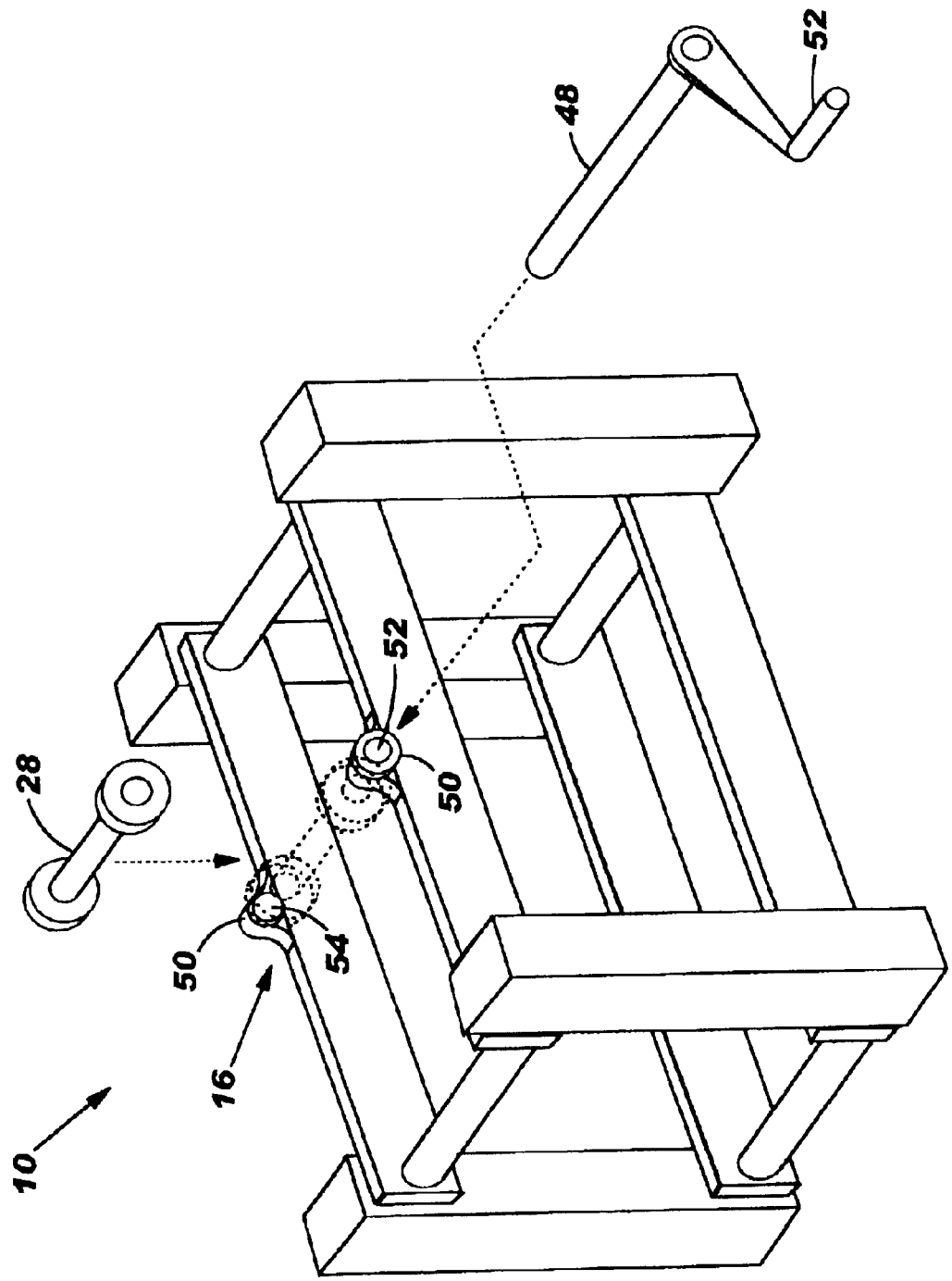
FIG. 6 is an isometric view of an alternative embodiment of the winch shown in FIGS. 1 and 5.

FIG. 6 is an isometric view of an alternative embodiment of the winch 16. Here the spindle 48 is removable from the journal bearings 50. The spindle 48 may be slid into and out of the journal bearings 50 and the drum 28. This removable feature allows different sized drums 28 to be installed on the spindle 48. The spindle 48 inserts into and through a right journal bearing 52, then through the drum 28, and then into and through an opposite, left journal bearing 54. The winch 16 may thus accommodate small drums for small gauge communication cable, and the winch 16 may also accommodate a larger spool for larger gauge communication cable.

Figure 7:
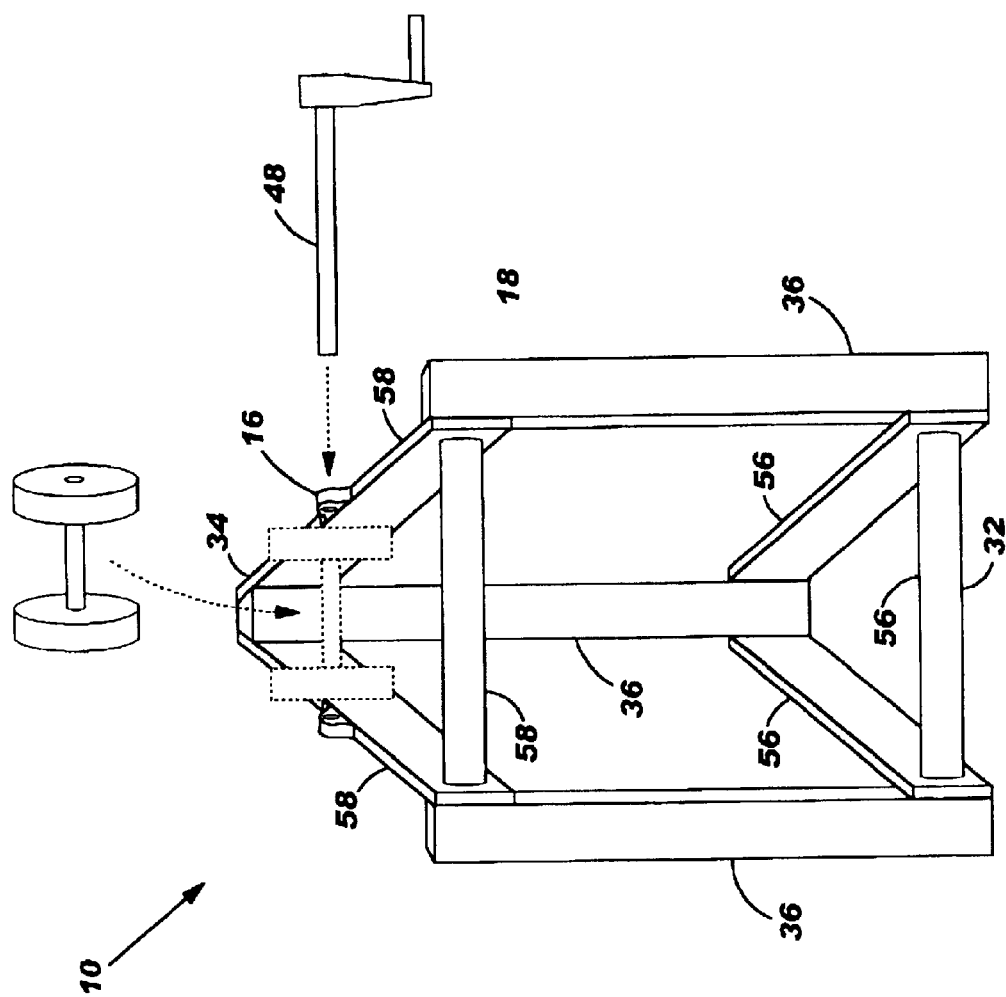
FIGS. 7 and 8 are views of an alternative embodiment of the apparatus.
Figure 8:
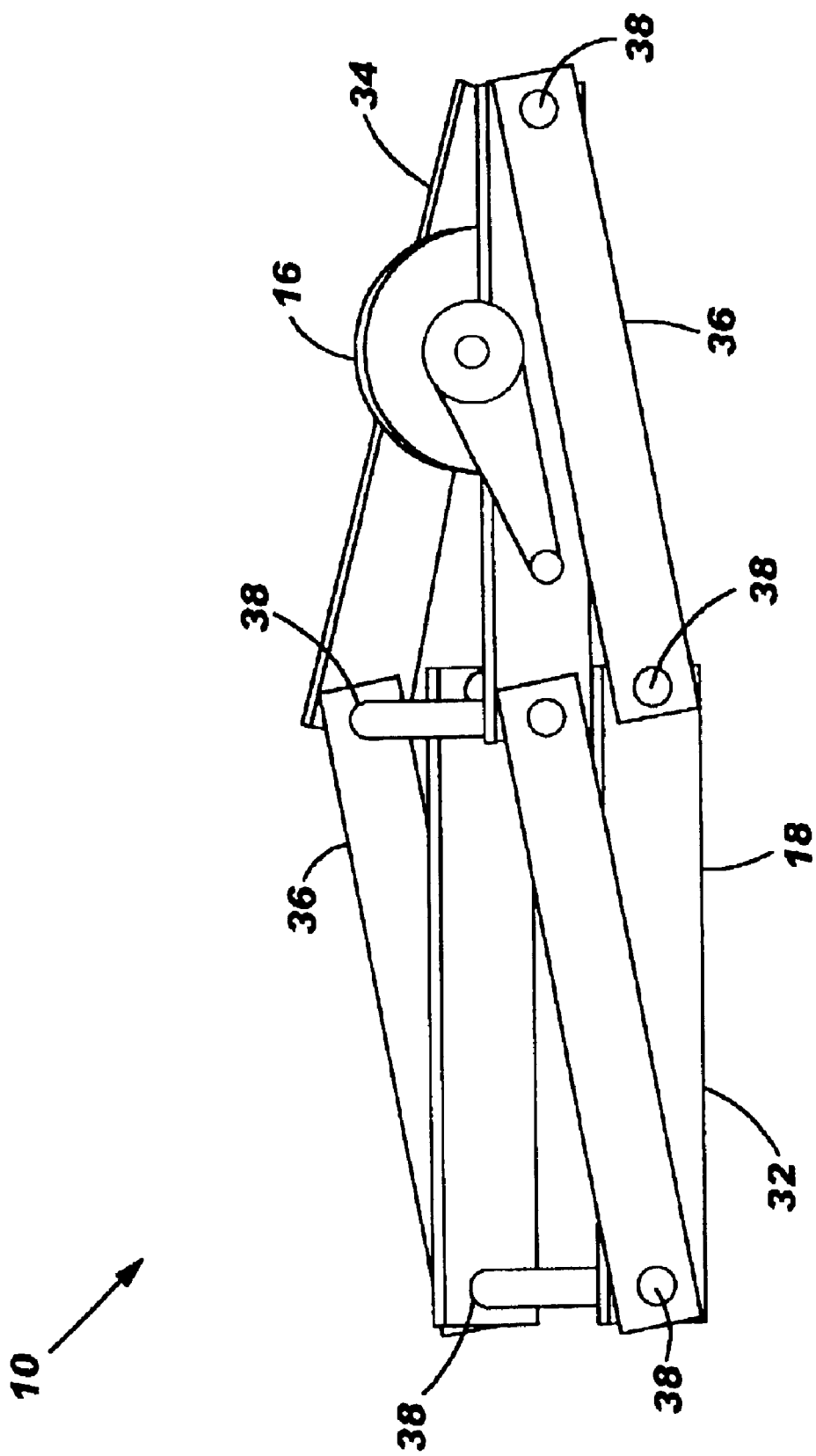

FIGS. 7 and 8 are views of an alternative embodiment of the apparatus 10. The stand 18 has the base 32 connected to the upper frame 34 by at least three (3) upwardly extending supports 36. FIG. 7, however, shows the base 32 having a triangular shape. The base 32 comprises three (3) base members 56 arranged in a triangular shape. The upper frame 34 may also comprise three (3) upper members 58 also arranged in a triangular shape. The three (3) base members 56 may have a coplanar arrangement, and the three (3) upper members 58 may also have a coplanar arrangement. As FIG. 8 shows, at least one of the supports 36 is pivotally mounted 38 to at least one of the base 32 and the upper frame 34. Because at least one of the supports 36 is pivotally mounted, an individual may collapse the upper frame 34 toward the base 32. The pivotal mount 38 may comprise a bolt or pin and a yoke (also not shown) that allows the stand 18 to collapse for easier stowing and for easier carrying. FIG. 7 also shows the winch 16 may include the removable spindle 48 as explained with reference to FIG. 6.

Figure 9:
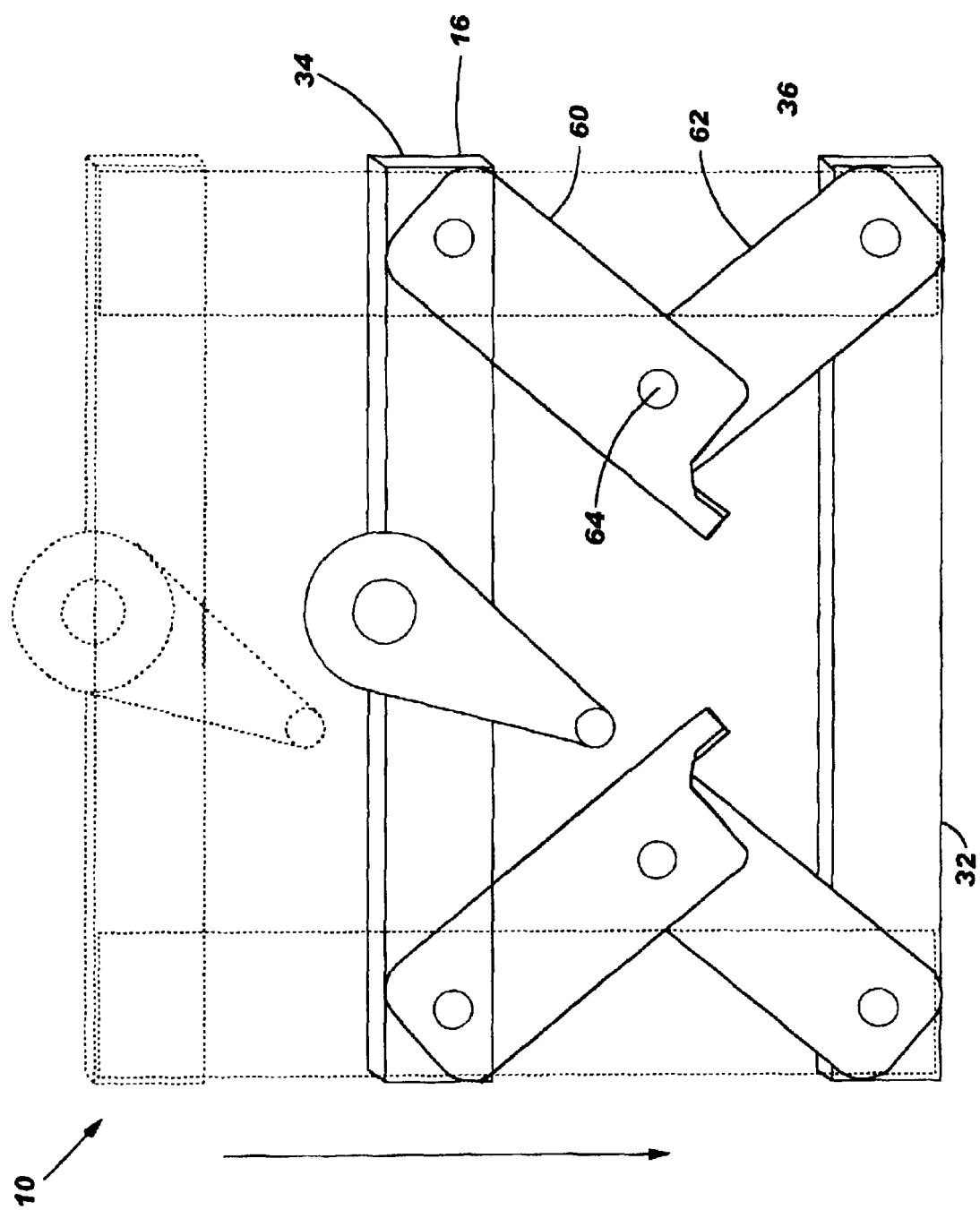
FIGS. 9–11 are orthographic views of yet another alternative embodiment of the apparatus.
Figure 10:
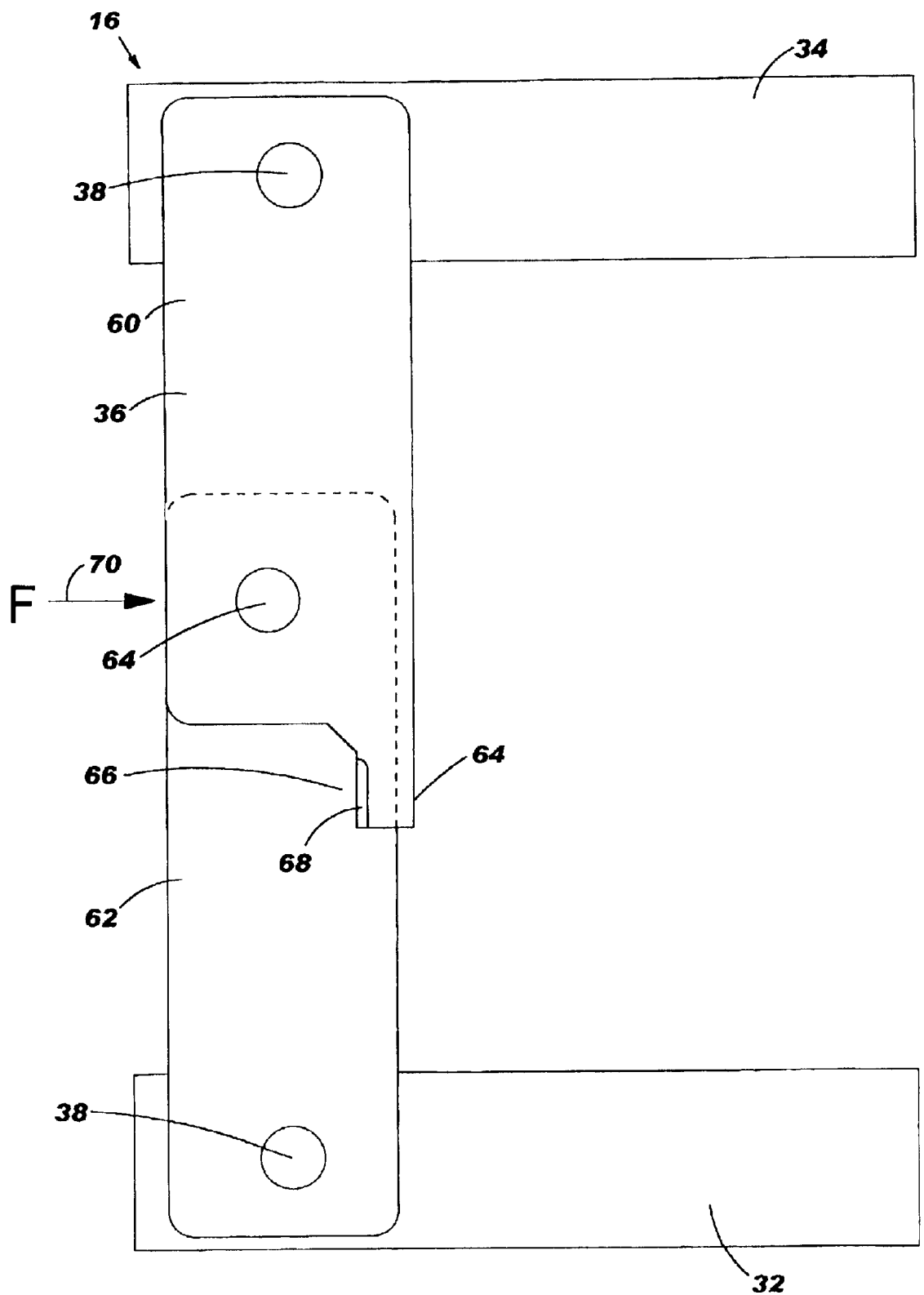
Figure 11:
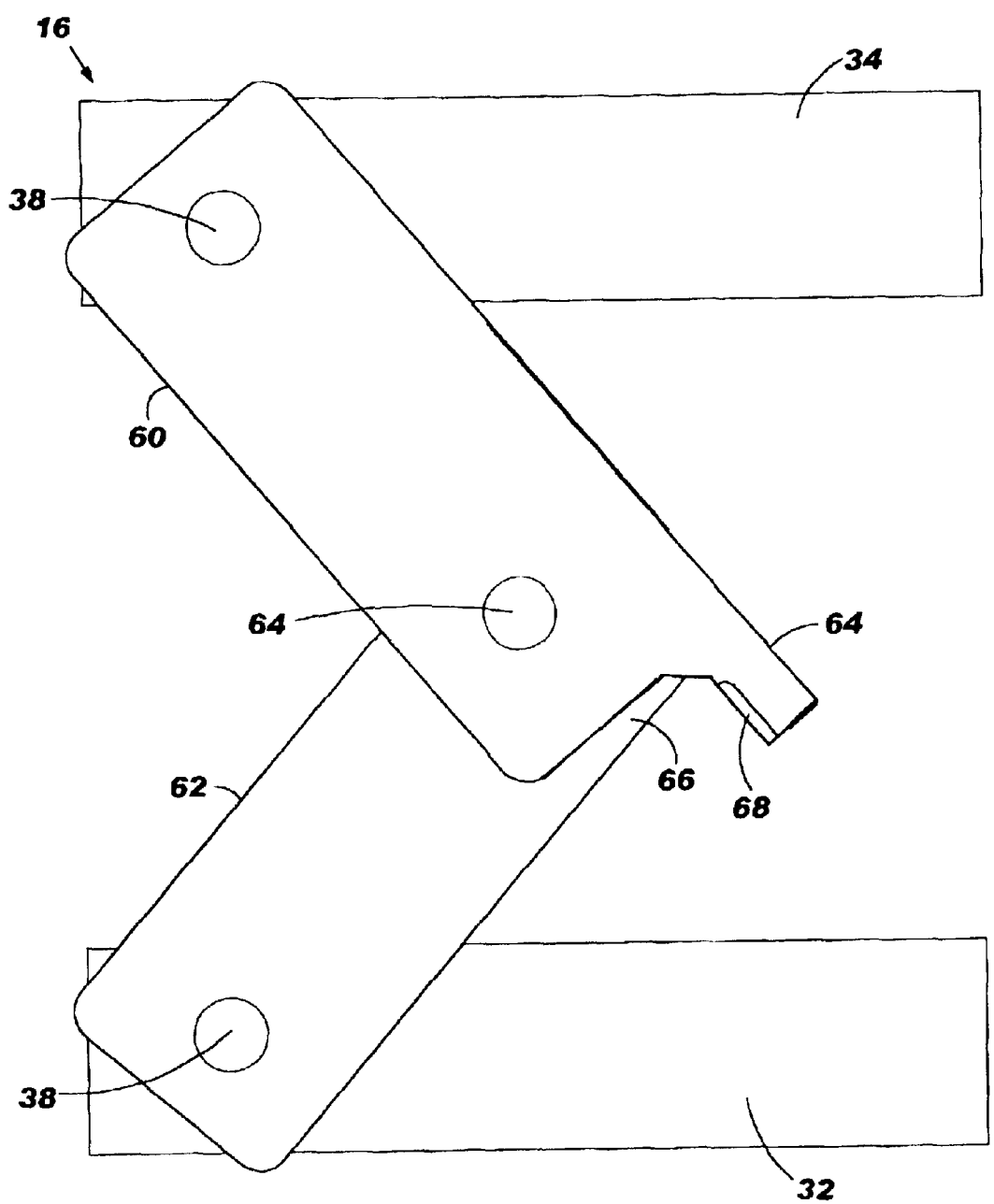

FIGS. 9–11 are orthographic views of yet another alternative embodiment of the apparatus 10. This embodiment is similar to that shown in FIGS. 2 and 3, yet this embodiment includes a different mechanism for collapsing the stand 16. Here each support 36 comprises an upper portion 60 hinged to a lower portion 62. A hinge 64 allows the upper frame 34 to collapse downward toward the base 32. The upper portion 60 of each support 36 is hinged to the upper frame 34, while the lower portion 62 of the support 36 is hinged to the base 32. The hinge 64 allows the upper frame 34 to collapse downward toward the base 32 with a scissors appearance and motion.

FIGS. 10 and 11 are enlarged views showing at least one of the supports 36 may also comprise a tab 64. The tab 64 downwardly extends from the upper portion 60 of the support 36. The tab 64 contacts an upper region 66 of the lower portion 62. When the tab 64 contacts the upper region 66 of the lower portion 62 of the support 36, the tab 64 restricts motion of the upper portion 60 relative to the lower portion 62. The tab 64 prevents the hinged support 36 from rotating in an undesirable direction.

The tab 64 may also engage the lower portion 62 of the support 36. The tab 64 may include an indent 68 that frictionally contacts the upper region 66 of the lower portion 60. This indent 68 helps maintain the upper portion 60 vertically aligned with the lower portion 62. When an individual wants to collapse the stand 16, the individual must apply a lateral force "F" (shown as reference numeral 70 in FIG. 10) to the hinge 64. A sufficient lateral force "F" overcomes the frictional engagement between the indent 68 and the upper region 66 of the lower portion 60. When the frictional engagement is overcome, the hinge 64 allows the upper frame 34 to collapse downward toward the base 32 with a scissors motion. The indent 68 thus "locks" the tab 64 to the lower portion 62 of the support 36.

Those of ordinary skill will now realize the tab may alternatively extend from the lower portion 62 of the support 36. The tab 64 could upwardly extend from the lower portion 62 and contact a lower region of the upper portion 60. When the tab 64 contacts the lower region of the upper portion 60 of the support 36, the tab 64 restricts motion of the upper portion 60 relative to the lower portion 62. The tab 64, likewise, may also engage the upper portion 60 of the support 36. Because the tab 64 could alternatively upwardly extend from the lower portion 62, the indent 68 could frictionally contact the lower region of the upper portion 60. The indent 68 maintains the upper portion 60 vertically aligned with the lower portion 62, and the lateral force "F" would overcome the frictional engagement between the indent 68 and the lower region of the upper portion 60.

The stand (shown as reference numeral 16 in FIGS. 1–11) may have alternative configurations. The base 32, for example, is shown and described as either rectangular or triangular in configuration, but the base 32 may have any shape. The upper frame 34, likewise, may also have any configuration. The base 32 and the upper frame 34 need not have the same shape; for example, the base 32 could have a circular configuration while the upper frame 34 could have a rectangular configuration. The stand may also be configured with only the base 32 and the upwardly extending supports. The upwardly extending supports would converge at the winch. The stand could alternatively be configured without the base, wherein the supports would hinge and fold from the upper frame (e.g., similar to folding card table).

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An apparatus for pulling communication cable through conduit, comprising:

a winch mounted to a stand, the stand comprising a base connected to an upper frame by at least three supports, each support pivotally mounted to the base and to the upper frame, and each support comprising an upper portion hinged to a lower portion such that the upper frame collapses toward the base, with at least one of the supports comprising a tab that restricts motion of the upper portion relative to the lower portion, wherein the stand is positioned above the conduit and the winch is used to pull the communication cable through the conduit.

2. An apparatus for pulling communication cable according to claim 1, wherein the base is substantially rectangularly-shaped.

3. An apparatus for pulling communication cable according to claim 1, wherein the upper frame is substantially rectangularly-shaped.

4. An apparatus for pulling communication cable according to claim 1, wherein the upper portion of the support is hinged to the upper frame.

5. An apparatus for pulling communication cable according to claim 1, wherein the lower portion of the support is hinged to the base.

6. An apparatus for pulling communication cable according to claim 1, wherein the base comprises at least three members.

7. An apparatus for pulling communication cable according to claim 6, wherein the at least three members are coplanar.

8. An apparatus for pulling communication cable according to claim 1, wherein the upper frame comprises at least three members.

9. An apparatus for pulling communication cable according to claim 8, wherein the at least three members are coplanar.

10. An apparatus for pulling communication cable according to claim 1, wherein the stand has a size not exceeding about one cubic foot (1 ft$^3$).

11. An apparatus for pulling communication cable according to claim 1, wherein the winch is mounted to the upper frame of the stand.

12. An apparatus for pulling communication cable through conduit, comprising:

a winch mounted to a stand, the stand comprising a base connected to an upper frame by at least three supports, each support pivotally mounted to the base and to the upper frame, and each support comprising an upper portion hinged to a lower portion such that the upper frame collapses toward the base, with at least one of the supports comprising an indent that frictionally engages at least one of the upper portion and the lower portion.

wherein the stand is positioned above the conduit and the winch is used to pull the communication cable through the conduit.

* * * * *